United States Patent
Häberli

(10) Patent No.: US 8,643,469 B2
(45) Date of Patent: Feb. 4, 2014

(54) ACCESS CONTROL SYSTEM, AND CLOSING MECHANISM

(75) Inventor: Andreas Häberli, Bubikon (CH)

(73) Assignee: Kaba AG, Wetzikon (CH)

( * ) Notice: Subject to any disclaimer, the term of this patent is extended or adjusted under 35 U.S.C. 154(b) by 795 days.

(21) Appl. No.: 12/529,866

(22) PCT Filed: Mar. 5, 2008

(86) PCT No.: PCT/CH2008/000089
§ 371 (c)(1),
(2), (4) Date: Dec. 16, 2009

(87) PCT Pub. No.: WO2008/106816
PCT Pub. Date: Sep. 12, 2008

(65) Prior Publication Data
US 2010/0171589 A1      Jul. 8, 2010

(30) Foreign Application Priority Data

Mar. 5, 2007   (CH) .......................................  352/07

(51) Int. Cl.
*G05B 19/00*    (2006.01)

(52) U.S. Cl.
USPC ........... 340/5.82; 340/5.1; 340/5.2; 340/5.64; 340/5.61; 340/426.1; 340/426.28; 340/539.1; 340/573.1; 340/584; 340/686.6; 315/312; 315/313; 315/314; 315/315; 324/661; 324/660; 324/658; 292/163; 292/336.2; 200/61.62

(58) Field of Classification Search
USPC ............... 340/5.82, 5.1, 5.2, 6.61, 5.64, 5.72, 340/426.1, 426.28, 539.1, 573.1, 584, 340/686.6, 0.61, 686.65; 70/145, 257, 277, 70/486; 200/61.62; 292/163, 36; 315/312, 315/313, 314, 315; 324/660, 661, 658
See application file for complete search history.

(56) References Cited

U.S. PATENT DOCUMENTS

| | | | | |
|---|---|---|---|---|
| 3,872,696 | A | * | 3/1975 | Geringer .......................... 70/145 |
| 4,591,854 | A | | 5/1986 | Robinson |
| 5,796,827 | A | * | 8/1998 | Coppersmith et al. ........ 713/182 |
| 5,914,701 | A | | 6/1999 | Gersheneld et al. |
| 6,145,353 | A | * | 11/2000 | Doucet ............................ 70/277 |
| 6,218,955 | B1 | * | 4/2001 | Conklin ....................... 340/5.61 |
| 6,286,347 | B1 | | 9/2001 | Frolov |

(Continued)

FOREIGN PATENT DOCUMENTS

| | | | |
|---|---|---|---|
| DE | 3620799 A1 * | 2/1987 | ............. E05B 51/00 |
| DE | 102005055882 A1 | 6/2006 | |

(Continued)

*Primary Examiner* — George Bugg
*Assistant Examiner* — Paul Obiniyi
(74) *Attorney, Agent, or Firm* — Rankin, Hill & Clark LLP

(57) ABSTRACT

In one embodiment of the invention, the access control system comprises a door with an integrated mechatronic closing mechanism which is equipped with a receiver device. The receiver device is designed to receive and evaluate capacitive-resistive signals that are emitted by a transmitter and are transmitted via a user's body. The closing mechanism opens or does open the door in accordance with a result of said evaluation. In said one embodiment of the invention, the closing mechanism is battery-operated and has no permanent electric connection to an object that is not located on or in the door.

10 Claims, 3 Drawing Sheets

(56) References Cited

U.S. PATENT DOCUMENTS

| | | | |
|---|---|---|---|
| 6,351,206 B1* | 2/2002 | Schweiger et al. | 340/5.64 |
| 6,370,456 B1* | 4/2002 | Eiting et al. | 701/36 |
| 6,411,195 B1* | 6/2002 | Goldman | 340/5.1 |
| 6,429,782 B2* | 8/2002 | Pavatich et al. | 340/686.6 |
| 6,507,195 B1* | 1/2003 | Nonaka | 324/430 |
| 6,771,161 B1* | 8/2004 | Doi et al. | 340/5.64 |
| 6,864,780 B2* | 3/2005 | Doi et al. | 340/5.64 |
| 7,009,488 B2* | 3/2006 | Schwartz et al. | 340/5.2 |
| 7,126,453 B2* | 10/2006 | Sandau et al. | 340/5.61 |
| 7,202,772 B2* | 4/2007 | Emmerling et al. | 340/5.72 |
| 7,205,777 B2* | 4/2007 | Schulz et al. | 324/661 |
| 7,443,290 B2* | 10/2008 | Takiguchi | 340/539.1 |
| 7,868,746 B2* | 1/2011 | Richter | 340/426.28 |
| 2001/0032038 A1* | 10/2001 | Eiting et al. | 701/1 |
| 2004/0056758 A1* | 3/2004 | Schwartz | 340/5.2 |
| 2004/0125545 A1* | 7/2004 | Kobayashi et al. | 361/600 |
| 2005/0007243 A1* | 1/2005 | Emmerling et al. | 340/426.1 |
| 2005/0068712 A1* | 3/2005 | Schulz et al. | 361/287 |
| 2006/0070838 A1* | 4/2006 | Pellaton | 192/71 |
| 2006/0073272 A1* | 4/2006 | Carel | 427/126.3 |
| 2006/0184252 A1* | 8/2006 | Oddsson et al. | 623/24 |
| 2007/0023265 A1* | 2/2007 | Ishikawa et al. | 200/61.62 |
| 2007/0158952 A1* | 7/2007 | Huang | 292/163 |
| 2007/0216174 A1* | 9/2007 | Tanimoto et al. | 292/336.3 |
| 2007/0223196 A1* | 9/2007 | Kuo et al. | 361/710 |
| 2008/0024312 A1* | 1/2008 | Richter | 340/573.1 |
| 2008/0315798 A1* | 12/2008 | Diederiks et al. | 315/312 |
| 2009/0078011 A1* | 3/2009 | Avni | 70/486 |
| 2010/0060465 A1* | 3/2010 | Stetter | 340/584 |
| 2010/0253141 A1* | 10/2010 | Cara et al. | 307/9.1 |

FOREIGN PATENT DOCUMENTS

| | | | | |
|---|---|---|---|---|
| EP | 1154105 | A2 | 11/2001 | |
| EP | 1450489 | A1 * | 8/2004 | H03K 17/96 |
| FR | 2734596 | A1 * | 11/1996 | E05B 47/00 |
| GB | 2281938 | A * | 3/1995 | E05B 47/06 |
| WO | 2007/036061 | | 4/2007 | |
| WO | 2007/112609 | | 10/2007 | |

* cited by examiner

ACCESS CONTROL SYSTEM, AND CLOSING MECHANISM

BACKGROUND OF THE INVENTION

1. Field of the Invention

The invention relates to the field of access and entry control, in particular of access control to buildings and to rooms within buildings.

2. Description of Related Art

Classically, the access control to buildings or other properties is effected by way of mechanically coded keys, whose mechanical coding represents certain authorisations to the carrier of the key—for example the authorisation of a user to have entry into a building or to drive a car, by way of the opening of a door. Electronic access control, with which data is exchanged between a data carrier of the user and a data processing device, and with which the access or entry authorisation is determined on account of the results of a data exchange, is becoming of increasing importance. The data exchange may thereby be effected in any type of manner, for example via electrical signals, optically or via induction or electromagnetic waves (for example RFID).

It is already also known to use capacitive coupling (sometimes also called capacitive-resistive coupling, "intrabody" coupling or PAN coupling) for the access and entry control. With this, small currents are produced in the human body between a transmitter and a receiver, which may be used for information transmission between the transmitter and the receiver.

This type of coupling is disclosed in the U.S. Pat. Nos. 4,591,854, 5,914,701 and 5,796,827. Applications of these are described in the international patent application PCT/CH 2006/000518 as well as in published documents of various proprietors.

The particular advantage of the capacitive coupling by way of the human body is the selectivity of the data transmission. Depending on the constellation, one may determine with quite a high reliability that the signal received by the receiver could only have been transmitted by that person who is in the direct vicinity or in physical contact with a receiver electrode provided for this.

The disadvantage amongst other things, is that on account of the poor signal-to-noise ratio (actually: the signal-to-interference ratio), one may only transmit a limited amount of data. A good signal-to-noise level is only possible with a large amplitude of the transmission signal. A large amplitude (i.e. a large voltage) however tends not to be tolerated by the user. Ideas of solutions, with which this problem may be dealt with, are described in the international published document WO 2007/112609. The bandwidth of the signal transmission however remains limited despite this.

Moreover, the installation of a system with a capacitive-resistive signal transmission is relatively complicated and there exists no compatibility with existing systems. For this reason, this type of access control could not yet become established on the market.

Other access control systems with electronic keys, although not being established in their applications, are however often perceived by the user to be impractical or even annoying. Thus, before each opening of a door, a badge must be held up to a reader envisaged for this, and the release of the door awaited. It is particularly in buildings, in which the inner doors are also secured, that this disrupts the flow of work and leads to an improvised circumvention of the system, for example by way of leaving the doors permanently open, often with the simplest of means, for example by way of blocking the doors with an object.

It is the object of the invention to provide a system and a locking device, which overcomes disadvantages of the systems according to the state of the art and which entails as little effort as possible, in particular in the installation as well as with the daily use.

This object is achieved by the invention as is defined in the patent claims.

According to a first aspect of the invention, the access control system for a building or a building part (room, region, building wing etc.) comprises a door with an integrated mechatronic locking device, wherein the locking device comprises a receiver, which is designed to receive and evaluate capacitive-resistive signals which are emitted from a transmitter and transmitted via a body of a user, wherein the locking device either releases the door or not, depending on a result of this evaluation.

Applicable to all aspects of the invention, such a system also permits a direct, short-range communication (not via the body), for example by way of holding the transmitter in the direct proximity of a receiver electrode, i.e. applications of the invention are not restricted to coupling by way of the human body, but also extend to cases in which the user carries the apparatus having the transmitter and holds it in the proximity of a receiver electrode, or in any other manner, permits the communication between the transmitter and receiver to be effected directly and not exclusively via the body.

According to the first aspect of the invention, the locking device is then battery-operated and is free of a fixed electrical connection to an object which is not located in or on the door.

In other words, according to the first aspect of the invention, the door is a "standalone" device, which does not need to be wired to other units, and is autonomous with regard to the electrical supply as well as the receipt of data.

The receiver—and this applies to respective receivers according to each of the aspects of the invention—as mentioned, is designed to receive capacitive-resistive signals transmitted via a body of a user, and to evaluate them. This means that the receiver must be sufficiently sensitive, in order to receive such signals transmitted via the body. It of course does not exclude the user holding the transmitter device—and this may be designed as a smart card or as a smart card cover, or in any other manner—directly in the proximity of a receiver electrode of the receiver, by which means the signal is transmitted in a purely capacitive—"only through the air" manner (to be precise, in each case, for example via space earth, there is yet a second signal path (signal return path), which for example is described in the document U.S. Pat. No. 4,591,854. This return path may also then partly run through the body when the forwards path runs directly from the transmitter device to the receiver without the signal path running through the body).

The capacitive-resistive information transmission entails the aspect of the person selectivity which is very important for access control: on account of the very short range of this interaction, one practically ensures that the person who is located in the direct vicinity of the receiver electrode—this for example is formed by a mechanical door handle or door fitting—is also that person who carries the transmitter, from which data is received, or who is in contact with it. Despite this, in contrast to the classical mechanical or mechatronic key—with which this type of person selectivity is of course also given—it is not necessary for the user to awkwardly get the key from his pocket and standing still whilst unlocking.

The idea according to the first aspect of the invention then has the great advantage, that a mechatronic locking device with a receiver may be used without additional effort in existing properties, and may even be installed into existing doors, for example as a compact lock cylinder and/or door fitting, which may be assembled on the door as a whole and, for example, in a standardised size. The conversion of an existing mechatronic system into a mechatronic system according to the invention is also possible. In particular no wiring of the door is necessary, which would require a great deal of effort. This is particularly advantageous for applications in which the door is for example the door of an inner room, which does not need to meet the highest of security requirements, which is not wired in any case and which must also be relatively inexpensive.

The transmitter for many applications is a portable apparatus, which may be carried along by the user in his pocket, or which may be held on a piece of clothing as a badge or be worn as a wrist watch. It may however also be stationary relative to the door and be arranged such that the user during the door opening procedure brings a body part into its vicinity and/or partly contacts it. This variant is yet described in more detail hereinafter by way of the second aspect of the invention.

Also according to the second aspect of the invention, the access control system comprises a door with an integrated mechatronic locking device, wherein the locking device comprises a receiver, which is designed in order to receive and evaluate capacitive-resistive signals emitted by a transmitter and transmitted via a body of a user, wherein the locking device releases the door or not depending on a result of this evaluation. According to the second aspect of the invention, an electrode of the transmitter is now installed in a fixed manner on an object in the vicinity of the door—possibly even on the door itself. The user thus does not necessarily carry the transmitter with him, but it serves quasi during the door opening procedure only as a—necessary—information transmission medium.

The transmitter may for example be arranged on a wall in the vicinity of the door to be opened—for example in the door bell—or on posts provided for this or posts which are present in any case. It is preferably integrated into an apparatus, which also contains a reader for reading out for carrying out an identification, for example by way of reading out a signal from an identification medium (for example a RFID chip) or by way of recognition of biometric features (thermal fingerprint, picture processing etc.) and/or by way of the input of an identification code (PIN code for example) by the user. A communication connection exists between the reader and the transmitter. As soon as the reader recognises that the person demanding access is authorised to access—this may be effected by way of biometric features known per se from RFID identification media or from readers—the transmitter begins with the emitting of a signal via a transmitter electrode. This electrode is arranged in a manner such that the user is located in any case in its vicinity, when his authorisation is checked. The signal is transmitted through the user in a capacitive-resistive manner. If it is received by a receiver electrode present in the door (or possibly in its direct vicinity), a suitable drive in the door opens the locking device, and the door may be opened by the user.

The possibly used "identification medium" does not need to be personalised or one of a kind, but may designed in the manner of an electronic key known per se. One may, for example, envisage all staff of an organisation—or possibly only the staff with a certain function—carrying an identical identification medium. An identification medium (and/or a corresponding identification signal and/or a corresponding identification code to be inputted, for example, via a keyboard) may thus personally identify the user, but may also identify him as a member of a group (for example the group of authorised persons).

It is possible by way of this concept, for the door itself, apart from the electrical drive and the respective activation electronics, to only require one receiver for the capacitive-resistive information transmission. A corresponding electrode may be formed, for example, by a door handle which is present in any case or by a door fitting. Such receivers are very simple and may be installed into existing doors without further ado. In particular, the door requires no separate electricity supply (as in the first aspect). All communication channels may also be short-range, which is very advantageous for applications of access control where security may be relevant. Thus in particular, it is possible:

for an identification medium to be carried by the user, to be used without electricity supply (thus also without a battery), or for biometric features of the user to serve as an identification medium, and/or for the door, despite this, to be provided only with a battery-operated receiver and battery operated logics and in particular not to have to be wired.

With the concept according to the invention, thus as a result, all components which require a wiring, may be attached at any selectable location in the vicinity of the door, specifically for example into a single apparatus. This is very advantageous for a retrofit into an already existing building or in the context of defined doors. The wired apparatus located in the vicinity of the door in particular may also be connected or connectable "online" to a control centre, and authorisations or other information may be programmed or transmitted via this online connection.

Independently of this, the inventive concept also permits the combination of metallic door fittings with RFID identification technology or with other identification technology, with which signals are transmitted via electromagnetic fields (for example inductively and/or via electromagnetic waves). Until now, such was not possible since metallic fittings or even metallic doors shield such signals and a corresponding receiver or transmitter has no effect when it is arranged behind the fitting.

Particularly preferred is a combination of the first with the second aspect. This combination permits existing doors to be retrofitted in the simplest manner, such that they may be retrofitted by any selected data carriers, which function as keys, to any system or even to a combination of different systems.

According to a third aspect of the invention, a system for the access control to a building with outer doors and inner doors is provided, which comprises at least one first locking device and a plurality of second locking devices, wherein the first locking device or at least one of the first locking devices is arranged for locking and unlocking an outer door, and the second locking devices for locking and unlocking inner doors, and wherein the at least one first locking device comprises first means for receiving information from the user, and the second locking devices comprise second means for receiving information from the user. The system is then characterised in that the second means comprises a receiver of capacitive-resistive signals transmitted by the body of the user, and that the first means are different from the second means.

This is based on the concept that the access to rooms must also be organised in the inside of buildings, but that for reasons of comfort, the highest security level does not need to apply for each door. For example, it is tiresome if the user must actively present a key and unlock the door for each of the doors in the inside of a building. In buildings, in which this is the case, inner doors are often left negligently open, which reduces the security. Thanks to the inventive concept, in particular it is possible for a natural course of movement to be possible for the user. If he carries a permanently active transmitter for the capacitive-resistive communication in his pocket or on his person and approaches a door, the locking device will receive a signal from the transmitter as soon as a body part of the user is located in the direct vicinity of the respective receiver electrode—and this is formed for example by a door handle or door fitting as in the above examples. Since a transmission of high data quantities is not necessary, the information transmission and the subsequent release may be effected and completed within a fraction of a second when the user actuates the door handle. In particular, the user neither needs to take an object from his pocket nor hold a badge up to a respective surface, nor does he need to change his course of movement in any other way. To him, the door appears to be open from the very beginning.

Of course, a corresponding procedure is also possible with doors which automatically open (sliding doors for example); wherein then the respective procedures preferably take their course so quickly, that the user may go through the door at normal walking speed, without him having to wait for the door to open.

The unlocking means to be used by the user for opening the inner doors may comprise a transmitter for the capacitive-resistive information transmission. It may optionally contain additional means in order actuate the first locking devices (only one device necessary for outer doors and inner doors). For example, it may be designed as a card which may also be used for RFID identification, or it may be present as a key which also has mechanical codings and/or an identification chip for RFID identification or other electronic identification. If the unlocking means is present as a key with mechanical codings, a metallic surface having the mechanical coding may at the same time also serve as an electrode for contactless communication. Of course, the unlocking element may also be combined with other functionalities and, for example, be designed as a mobile telephone, watch etc.

One may also envisage the first unlocking means (for actuating the first locking devices) and second unlocking means (for actuating the second locking devices) being separate from one another. In particular, the mentioned second unlocking means with the transmitter may be designed as a sleeve for an identification card (which for example may be used as first unlocking means for actuating the first locking devices), wherein optionally an interface may be present between the sleeve and the identification card. A corresponding teaching may be found for example in the international patent applications PCT/CH 2008/000057, PCT/CH 2008/000058 and PCT/CH 2008/000059 of the applicant of the present patent application.

The second means preferably consist only of a receiver for capacitive-resistive signals, i.e. preferably the second locking devices are only opened by way of capacitive-resistive signals which may be transmitted through the body. It is then not necessary for the user to then unlock in different manners.

Particularly preferably, the system according to the third aspect of the invention is present in a semi-public building. Semi-public buildings are buildings to which everyone has access at least at certain times, but which have rooms for which this access authorisation does not apply. Examples of semi-public buildings are hospitals, official buildings (court buildings, administration buildings), hotels etc. In such buildings, the procedure according to the invention has special advantages. It is also advantageous that second locking devices with a receiver for the capacitive-resistive signals may be applied relatively simply in existing doors or at least doors which may be retrofitted into existing buildings. A very good retrofitting ability results due to this. Existing buildings may be retrofitted very easily with a system according to the third aspect of the invention.

The invention accordingly also relates, for example, to a semi-public building with a system according to the third aspect of the invention.

In this context, a combination with the first, the second or with the first and second aspect of the invention is particularly preferred.

The first locking devices may be designed in a conventionally mechanical manner (actuation by way of mechanically coded keys). Then, the first means for receiving information are means for mechanically reading out the key, thus for example tumbler—counter-tumbler pairs. The first locking devices may also be designed in an electronic manner (for example actuation by way of information exchange with an electronic key) or in a mechanical-electronic manner. A combination with a receiver for capacitive-resistive signals is also conceivable. On the other hand, the first means preferably do not only consist of such a receiver, but information is (also) exchanged via another channel.

Of course, one may envisage the first locking devices not always being activated. For example outer doors of the (for example semi-public) building may be constantly open during the day and only the inner doors locked as the case may be.

According to a fourth aspect of the invention, a system for the access control to an object which is provided with a door, which for its part may be locked by a locking device, is provided. The locking device comprises an outer receiver electrode and an inner receiver electrode which is not electrically connected to this in parallel. Given a closed door, the outer receiver electrode is accessible from outside the object, and the inner electrode from within the object. The electrodes are preferably present on the door itself (on its outer side or inner side, for example formed by the fitting, door handle etc.), but may also be located in the direct vicinity of this, for example on or at the door frame. The inner as well as the outer receiver electrodes are receiver electrodes of a receiver for capacitive-resistive signals transmitted by the body of the user. According to the third aspect of the invention, the system is then designed such that the locking device goes into a first unlocking condition, when a matching capacitive-resistive signal is received by the outer electrode, and goes into a second unlocking condition when a matching—for example the same—capacitive-resistive signal is received via the inner electrode. The first and the second unlocking condition are different from one another. In particular, in the first unlocking condition, the door may be locked after a reclosure, whereas in the second unlocking condition, the door is permanently open—i.e. until a signal is received by the outer electrode or until the door is closed by way of other procedures, for example actively by the user.

The object, with regard to which the access control is controlled by way of the procedure according to the fourth aspect, is for example a room in the inside of a building. The procedure according to the fourth aspect of the invention is based on the fact that an authorised person after access to a room often spends some time in this room. It may be desirable for third parties—who perhaps were not authorised to enter into the empty room—to be able to enter the room, for example after previously knocking on the door. If this is the case, the authorised person in the room does not have to actively actuate the door, in order to let someone in, who wishes to enter. Neither does a complicated door opening device which is to be controlled by the authorised person need to be provided. It is therefore desirable for the system to recognise that an authorised person is in the room. Since the authorised person closed the door from inside after he has gained access to the room, he is the last one who has contacted the door from the inside. By way of the procedure according to the invention, this serves as an indication that the user is located in the inside of the room. If he leaves the room, then he is the last one to contact the door on its outer side. The locking device is then set into the first unlocking condition, and the non-authorised person has no access to the room.

The procedure according to the fourth aspect of the invention is in particular suitable for rooms in which generally only a single person is present—thus for example individual offices.

Particularly preferred is a combination with the first, the second or the third aspect of the invention, or with any combinations of these three aspects. In particular, all four aspects or aspect one, three and four may be well combined into a complete system, with which the access authorisation in large buildings may be controlled in a practical manner and in one which has a low expense with regard to installation and maintenance.

Methods for controlling the access control, as are explained on operating a system according to the first, second third and fourth aspect of the invention, likewise belong to the invention.

BRIEF DESCRIPTION OF THE DRAWINGS

Embodiment examples of the invention are explained in somewhat more detail hereinafter by way of schematic drawings. In the drawings are shown in.

DETAILED DESCRIPTION OF THE INVENTION

Figure 1:
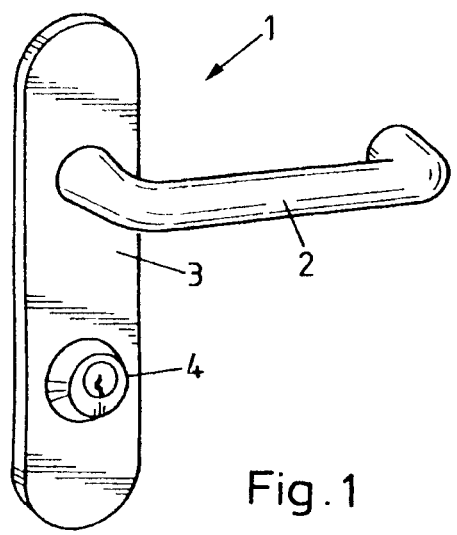
FIG. 1 a view of a door fitting with a door handle which functions as a receiver electrode.

The door fitting 1 represented in FIG. 1, which belongs to a door which is not shown, may be designed externally in a conventional manner and, for example, consist essentially of metallic components. It comprises an integrated mechatronic locking device. This prevents the door from being opened without the authorisation of the person wishing to access being electronically checked beforehand. For example, an electrically actuated locking element may be present in the door or in the door frame, which releases the door in an electronically controlled manner. Alternatively, the door handle may be locked or released by way of an electrically driven blocking member. A coupling between the door handle and a latch bolt or a bar may be engaged or disengaged as yet a further alternative. If the coupling is disengaged in the basic condition, the door handle, although being able to be actuated, however remains without effect. Further possibilities of locking or release of the door are conceivable.

According to the first aspect of the invention, the locking device is now provided with a receiver which comprises means to receive and evaluate a capacitive-resistive signal transmitted by the body of a user. Their release or non-release of the door is then effected whilst using the result of this evaluation. For this purpose, a receiver electrode is present on the door or in its direct vicinity. In the shown embodiment example, the receiver electrode is formed by the electrically conductive, specifically metallic door handle 2, which is electrically insulated from the remaining fitting. The remaining parts of the locking device are not drawn in the figure. The receiver may for example be designed according to WO 2007/112609, and the mechatronic locking device and/or coupling device may be designed according to a principle known per se, for example as in EP 1 576 246.

The locking device according to the first aspect of the invention in particular is free of a fixed wiring to parts which are not present on the door. The door may, therefore, be fastened to conventional door hinge pivots. The locking device comprises a battery compartment with batteries, which for example is accessible in a simple manner, e.g. by way of removing the fitting cover 3.

Optionally, yet an additional mechanical locking device—a mechanical closure cylinder 4 in the present example—and/or an additional electronic locking device, may be present.

The transmitter which transmits the data to be received by the receiver, by way of the body of the user, may be portable and be fastened by the user in a pocket or as a badge on a piece of clothing or may be carried as a wrist watch or mobile telephone. Alternatively to this, it may also be designed according to the second aspect of the invention.

A transmitter may also be present, apart from the receiver for the capacitive-resistive signals, so that a more complicated communications system between the door and a portable apparatus carried by the user—for example with data encoding algorithms and/or protocolling—is possible. WO 2007/036061 is referred to by way of example here.

In embodiments of the first aspect (and also of the other aspects of the invention, in particular of the second aspect) of the invention, the door fitting or even the whole door may be metallic. The door fitting in particular may be free of non-metallic surface sections, recesses or likewise, and a metallic element—with the exception of possible openings—may be introduced into the door handle shank, closure cylinder (in each case essentially metallic) and/or likewise and cover the complete fitting surface. This does not exclude the metallic element being coated by a non-metallic layer—for example oxide layer. This is in contrast to the door fittings for doors with RFID identification locking devices. With regard to the latter, the fitting, at least at the locations of the RFID antenna of the respective reader, may be non-metallic, wherein this fitting often comprises a flat base plate, which only has an opening in each case for the locking cylinder and the shank of the door handle.

In contrast to this, the fitting for a system according to the invention may essentially be metallic, with the exception of insulating elements between the electrode and the other parts of the fitting. This is advantageous for aesthetic reasons, and the existence of an electronic unit in the locking device may also be discretely covered. In particular, a fitting for a system according to the invention may comprise a base plate which is metallic and essentially flat, and only comprise suitable matching openings at the positions of the door handle (or of the door knob etc) and, as the case may be, of the locking cylinder.

Figure 2:
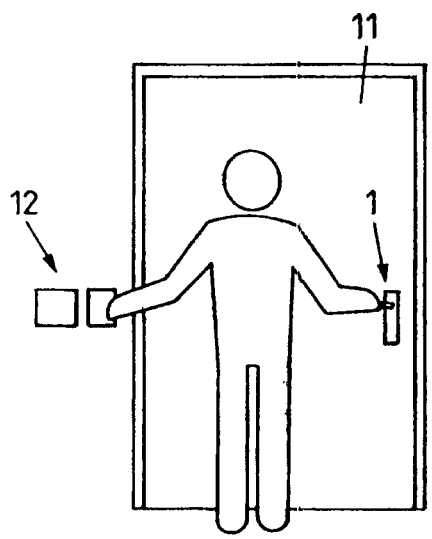
FIG. 2 a representation of one embodiment of the second aspect of the invention.

FIG. 2 shows a door 11 with an integrated mechatronic locking device, which is part of an access control system according to the second aspect of the invention. The door and the locking device may, for example, be designed as the door and locking device described by way of FIG. 1. Alternatively to this, the locking device may have a fixed wiring and may be supplied with electricity and/or be programmable by way of this. Apart from the mechatronic locking device integrated in the fitting 1, an apparatus 12 is present, which apart from a transmitter for capacitive-resistive signals, also comprises a reader. This is designed in order to read out identification signals from any identification medium, for example from a contacting or contactless chip card 13 or from an identification medium integrated into another apparatus. Alternatively or supplementarily to this, the reader may also be designed for recognising biometric features, for example as a thermal fingerprint reader, as a camera with an evaluation unit for recognising facial features and/or iris features etc. When actuating the system, the user brings the identification medium in contact with the reader or he holds it in its vicinity and/or brings a body part in contact with the reader or positions it in its vicinity. As a result of this, the signals transmitted from the transmitter after actuating the reader with a successful recognition of the user (or of his identification medium and/or of a PIN code inputted by him) are coupled into the body and received by the receiver in or on the door. A release of the door may be effected.

Figure 3:
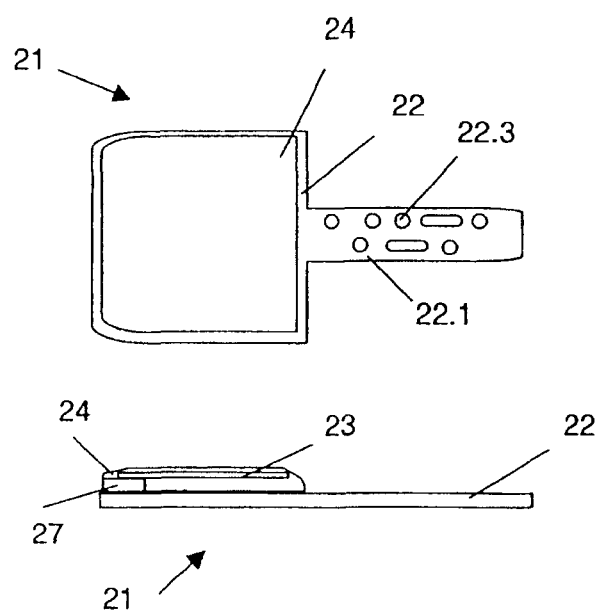
FIG. 3 a portable apparatus with a transmitter.

The portable apparatus represented in FIG. 3 is an example of a hybrid apparatus, which may be optionally applied in a system according to the third aspect of the invention. The apparatus is designed as a key, which is designed for actuating the first locking devices as well as for actuating the second locking devices. The figure shows the portable apparatus 21 in a plan view and in a sectioned representation.

For actuating the first locking devices, the key 21 comprises a metallic key base part 22 on which a key shank 22.1 is formed. The key shank may comprise coding holes 22.3 in the manner known per se, which cooperate with corresponding mechanical tumblers of a lock cylinder of the first locking devices. Other coding devices may also be alternatively or supplementarily present on the key. An identification chip 27—for example a LEGIC® chip is present in the shown example, which may be read out, for example, by way of a radio frequency signal and may likewise be used for the actuation of the first locking devices.

The key base part 22, apart from its cylinder opening function, simultaneously serves as a first electrode for the capacitive-resistive signal transmission which is required for the actuation of the second locking devices. The second electrode 23 is arranged in the inside of a key housing 24 which also has the necessary electronics (not drawn) for the storage, receipt and/or the transmitting of data, as well as antenna elements etc., as the case may be.

A communication connection may exist between the identification chip and the transmitter, for example via central electronics and/or a data processing unit and/or via an interface, for example a I²C interface.

Of course, with the embodiments of the invention according to its third aspect, one may also envisage mechanical and/or electrical keys which are separate from one another being used for the first and the second locking devices, i.e. the use of a hybrid apparatus is not necessary.

Figure 4:
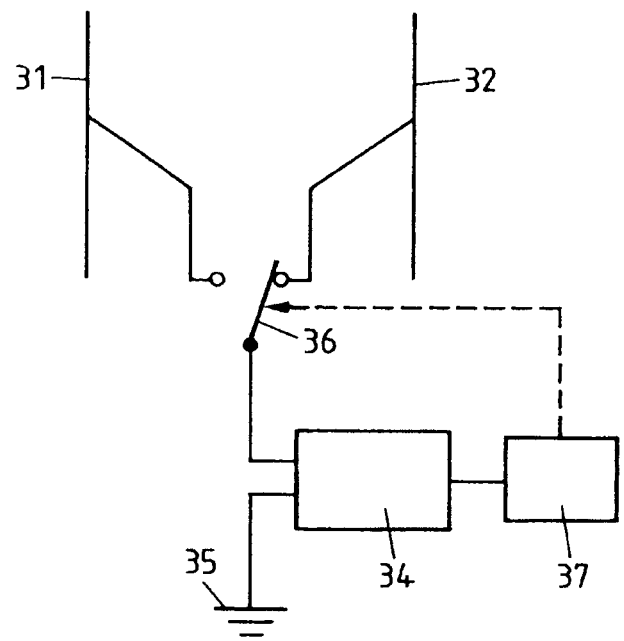
FIG. 4 a schematic diagram of a receiver arrangement with an outer and inner receiver electrode.

According to the fourth aspect of the invention, a system for the access control comprises doors, with which in each case a receiver electrode is assigned to an outer side as well as to an inner side. FIG. 4 shows a very simplified schematic diagram of such an arrangement with an outer receiver electrode 31 and an inner receiver electrode 32. In the drawn embodiment example, only a single receiver 34 for the capacitive-resistive signal is drawn. This detects the signals between the outer or inner receiver electrode, and a reference electrode, which in the shown example is formed by the earthing 35. One switches between the outer 31 and the inner electrode by way of a switch 36, wherein the switch, for example, may be actuated periodically at a frequency of a few Hz for example, so that the inner electrode as well as the outer electrode may be read out in an essentially continuous manner. One may also envisage the switch being controlled according to logics.

As an alternative, one may also envisage a receiver being assigned in each case to the inner side as well as the outer side.

The receiver (or the receivers) is (are) in communicating connection with locking device electronics 37. The receiver/the receivers may of course also be integrated into this. The locking device electronics control an electric drive, which when required releases the doors.

Figure 5A:
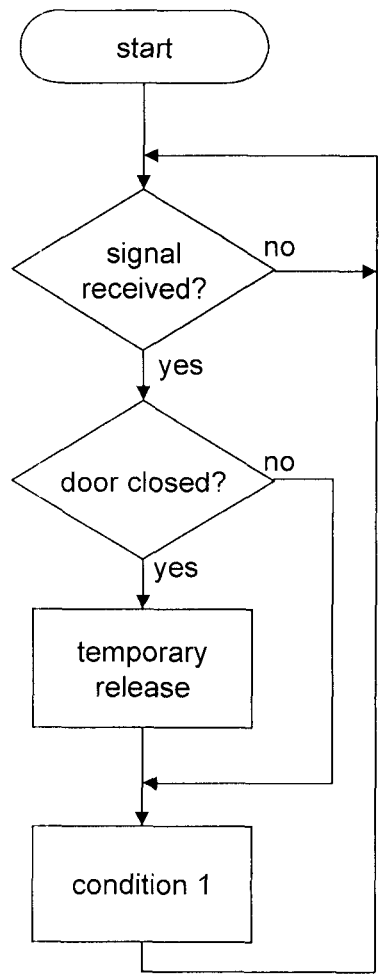
FIGS. 5a and 5b flow diagrams for the procedure according to the fourth aspect of the invention.
Figure 5B:
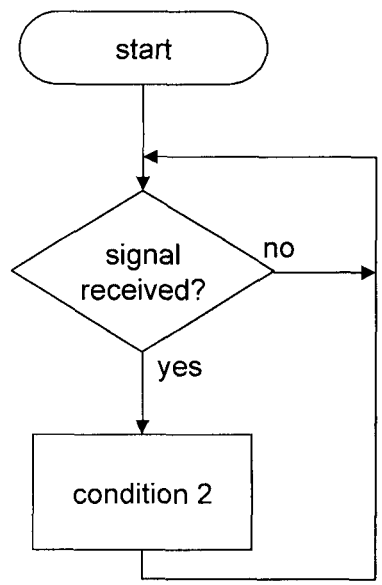

Flow diagrams for the procedure according to one embodiment of the fourth aspect of the invention are represented in FIGS. 5a and 5b. FIG. 5a relates to the outer electrode, FIG. 5b to the inner electrode. With both electrodes, in the shown embodiment, one constantly monitors as to whether a matching capacitive-resistive signal is received (box "signal received?"; and the respective method steps relate to the receipt of a matching signal, thus also include the comparison to stored data and/or other data analysis steps and/or data processing steps).

Given a detection of a matching signal via the outer receiver electrode (FIG. 5a), with the represented variant, one firstly checks as to whether the door is still closed. If this is the case, the situation is present, in which an authorised person wishes access to the object from the outside. The door is then released. Simultaneously or subsequently, the locking device is brought into the first unlocking condition or, inasmuch as it is already located in this, will confirm this. In the first unlocking condition, the door is only released when a matching signal is received via the outer electrode. If the door was already open, the situation may be present, in which an authorised person is in the process of leaving and the locking device was previously in the second unlocking condition. The locking device is then likewise brought into the first unlocking condition.

One may also envisage the differentiation of closed door/open door being done away with. In this more simple variant, at all events the locking device electronics are activated on receipt of a matching signal by the outer electrode, and the door released (in order for example to retract a bar element or couple the door handle to the latching bolt).

On receipt of a matching signal by the inner electrode (FIG. 5b), the locking device is transferred into the second unlocking condition. The door is permanently open in this condition, i.e. the bar element is permanently in the non-blocking position and/or the door handle is permanently coupled to the latch bolt etc.

One may yet provide further measures for the case that a matching signal is received from the outer side as well as from the inner side. For example, the receipt of a signal via the inner receiver electrode may be treated with priority, i.e. whenever a matching signal is received from the inside, the systems go over into the second locking condition. Other possibilities which also include a comparison of the signal strengths are also conceivable.

The invention claimed is:
1. A system for controlling access to an object with a door, the system comprising:
a mechatronic locking device for blocking or releasing the door, wherein the locking device comprises a receiver, which is equipped to receive and evaluate a capacitive-resistive signal emitted by a transmitter and transmitted via the body of a user, wherein the locking device releases the door or not depending on a result of this evaluation, wherein the locking device comprises an outer receiver electrode and an inner receiver electrode not electrically connected in parallel to the outer receiver electrode, wherein the outer receiver electrode, if the door is closed, is accessible from outside the object and the inner receiver electrode from within the object, and wherein the locking device is programmed to assume a first unlocking condition when a matching capacitive-resistive signal is received by the outer electrode, and to assume a second unlocking condition when a matching capacitive-resistive signal is received via the inner electrode, and wherein the first unlocking condition is different from the second unlocking condition.

2. The system according to claim 1, wherein the second unlocking condition is a condition in which the door is permanently unlocked.

3. The system according to claim 1, being battery-operated and free of a fixed electrical connection to an object not located on or in the door.

4. The system according to claim 2, wherein the first unlocking condition is a condition in which the door is locked after having been closed again.

5. The system according to claim 1, wherein the locking device comprises an actuation element, and a latch bolt, the latch bolt being operatively connected to the actuation element so that the latch bolt is capable of being actuated by the actuation element, wherein, when the door is not released, either the latch bolt blocks, or the actuation element is decoupled from the latch bolt.

6. The system according to claim 1, wherein the locking device comprises a bar element, and wherein the bar element blocks the doors against a door frame when the door is not released.

7. The system according to claim 1, wherein the locking device additionally comprises a mechanical or mechatronic locking cylinder functioning independently of the receipt of the capacitive-resistive signals.

8. The system according to claim 1, wherein the door comprises a metallic fitting.

9. The system according to claim 8, wherein the metallic fitting is electrically contacted to serve as the outer receiver electrode.

10. The system according to claim 1, further comprising a portable transmitter capable of emitting the capacitive-resistive signal.

* * * * *